United States Patent [19]
Aigrain

[11] Patent Number: 5,486,938
[45] Date of Patent: Jan. 23, 1996

[54] ANTI-DAZZLE SYSTEM FOR VEHICLES

[75] Inventor: Pierre Aigrain, Paris, France

[73] Assignee: Thomson-CSF, Puteaux, France

[21] Appl. No.: 419,754

[22] Filed: Apr. 10, 1995

Related U.S. Application Data

[63] Continuation of Ser. No. 94,025, filed as PCT/FR92/00148, Feb. 14, 1992, abandoned.

[30] Foreign Application Priority Data

Feb. 19, 1991 [FR] France .................... 91 01929

[51] Int. Cl.$^6$ .............................. G02F 1/135; G02F 1/13
[52] U.S. Cl. .................................... 359/72; 359/36
[58] Field of Search .................................. 359/72, 36

[56] References Cited

U.S. PATENT DOCUMENTS

| | | | |
|---|---|---|---|
| H686 | 10/1989 | Mullins | 350/352 |
| 3,245,315 | 4/1966 | Marks et al. | 88/61 |
| 4,085,426 | 4/1978 | Aigrain et al. | 360/38 |
| 4,286,308 | 8/1981 | Wolff | 362/19 |
| 4,692,798 | 9/1987 | Seko et al. | 358/93 |
| 4,818,011 | 4/1989 | Cherian | 296/97.2 |
| 4,944,575 | 7/1990 | Aigrain et al. | 350/333 |
| 4,981,340 | 1/1991 | Kurematsu et al. | 350/333 |

Primary Examiner—William L. Sikes
Assistant Examiner—Charles Miller
Attorney, Agent, or Firm—Oblon, Spivak, McClelland, Maier, & Neustadt

[57] ABSTRACT

In front of the driver there is arranged a screen (20) with a variable transmission coefficient. The headlamps (10, 11) of the vehicle send out periodic pulses of short duration with respect to the period. The transmission coefficient of the screen (20, 23, 24) varies in such a way that it is transparent during the duration of the light pulses and that the screen is substantially less transparent between these pulses.

11 Claims, 1 Drawing Sheet

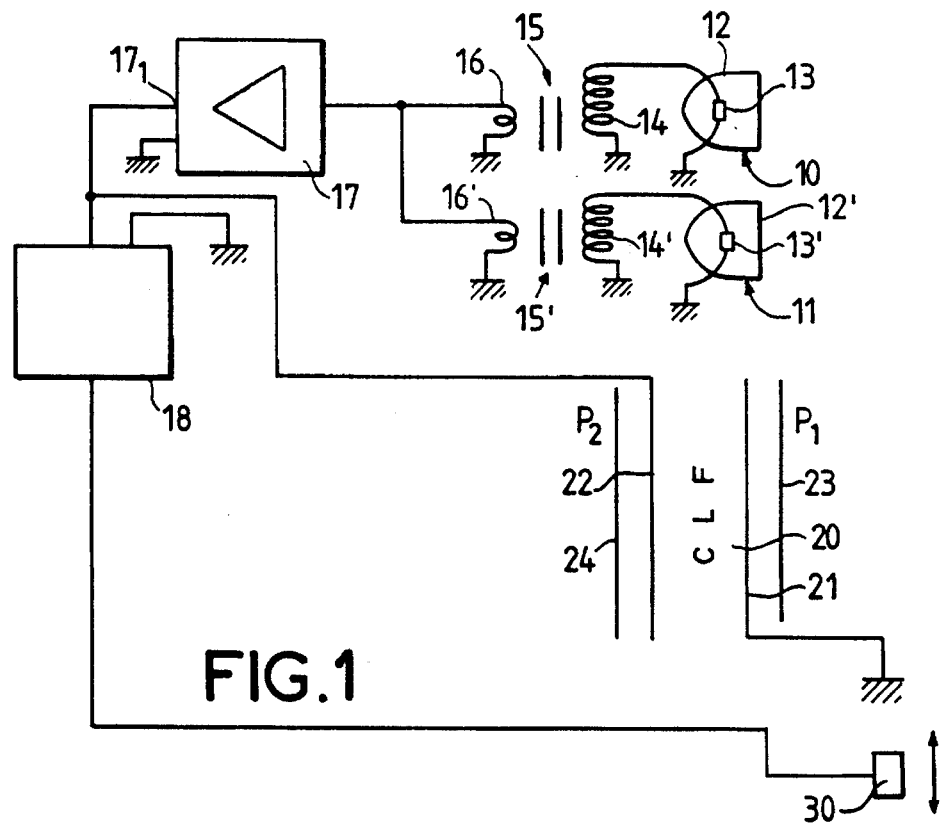
FIG.1
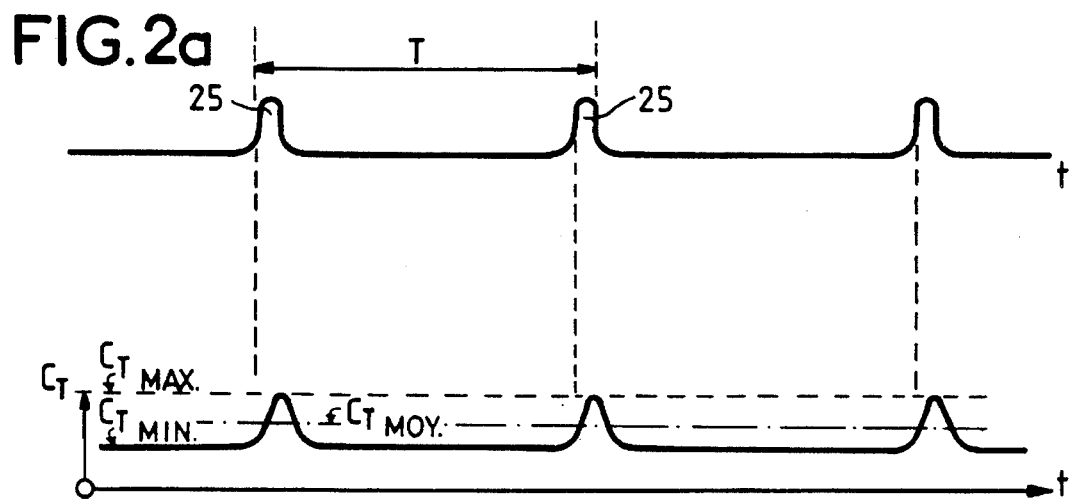
FIG.2a
FIG.2b

ANTI-DAZZLE SYSTEM FOR VEHICLES

This application is a continuation of application Ser. No. 08/094,025, filed on Jul. 29, 1993, now abandoned, which application is a 371 of PCT/FR92/00148, filed on Feb. 14, 1992.

The problem of dazzling, at night, of the drivers of motor vehicles by the headlamps of other vehicles travelling in the opposite direction has not been solved satisfactorily up to the present. However, this dazzling is particularly troublesome because it gives rise to fatigue and constitutes an accident risk factor even if the dipped beams of all the vehicles are correctly adjusted.

In order to resolve this problem it has already been proposed for the headlamps of vehicles to send out a circularly polarised light and for windscreens to be provided with a polarising screen attenuating the polarised light given out by the headlamps of vehicles arriving in the opposite direction without attenuating, for the driver, the brightness of the area illuminated by the headlamps of his own vehicle. Given that the screen does not attenuate the non-polarised light, in order for such a system to be of interest it would be necessary for all the vehicles to be equipped with it. In order to achieve this outcome it would be necessary, in a short time, to require all vehicles to be fitted. Such a measure is difficult to envisage.

The invention supplies an anti-dazzle system which does not depend on other vehicles being equipped.

In the system according to the invention the headlamp or headlamps of the vehicle send(s) out periodic pulses of light the duration of which is preferably short with respect to the period, and in front of the driver there is arranged a screen with a variable transmission coefficient such that it is transparent during the duration of the light pulses and that the coefficient of transmission is significantly lower between these pulses.

Hence the brightness of the illuminated area is practically not reduced for the driver since this area is illuminated only during the periods of maximum transparence of the screen; put another way, the driver benefits fully from the illumination supplied by his headlamp or headlamps. In contrast, the headlamps of the other vehicles, or the other sources continuously emitting visible light, are seen in an attenuated way since, most of the time, the screen exhibits a relatively low transmission coefficient and since the eye integrates this coefficient in time. This comment is valid not only for sources continuously emitting light, but also for other sources emitting light pulses, on condition that these pulses do not coincide with the transparence period of the screen.

Although the probability of coincidence in the maximum transparence periods of the screen with the periods of emission of light pulses by the headlamps of the vehicles coming in the opposite direction is low, it nevertheless remains that this probability is not zero. And if this coincidence comes about, then the system momentarily loses its anti-dazzle effectiveness. For this reason, according to the invention, there is provided in the vehicle, on the windscreen for example, a detector which is sensitive to the light pulses produced by the headlamps of vehicles coming in the opposite direction and the signal supplied by the detector is used by a control circuit in order, if necessary, to phase shift the light pulses and the screen transparence control pulses with respect to the detected pulses.

Preferably, the repetition frequency of the light pulses is such that the pulsed or periodic nature of the light emission is practically imperceptible. This frequency is, for example, of at least 200 pulses per second, which avoids stroboscopic effects as well as the direct perception of the periodic nature.

The duration of each pulse is, in one example, less than or equal to 1/50th of the repetition period. If the frequency is 200 pulses per second, the duration of the pulse will then be a maximum of 100 microseconds.

Preferably a means is provided, controlled for example from the dashboard, to make the screen permanently transparent, for example in the illuminated areas or on deserted roads or also by day.

In a variant, or in a complimentary way, the screen is retractable or removable so as to be able to be distanced from the eyes of the driver by day or in a sufficiently well illuminated area. For this purpose, the screen may be arranged in a way similar to a sun visor.

The lamps used in the vehicle will, for example, be of the "flash" type.

In one embodiment, the screen is of the liquid crystal, especially ferro-electric type. In order to make up the screen, it is possible, for example, to use the product sold by the MERCK Company under reference ZLI 4237, this screen being arranged between two polarisers.

In order to alter the transmission coefficient of this ferro-electric liquid crystal screen, it suffices to apply a relatively low control voltage, of the order of a few volts, between the two faces of the screen. The switchover time is less than 40 microseconds. The voltage applied alters the polarisation of the transmitted light and thus the transparence of the assembly formed by the screen and the two polarisers.

In order to control the switchover, it suffices to provide two electrodes, one on each face.

The screen has the shape of a rectangle of 30 cm by 15 cm, for example.

Other characteristics and advantages of the invention will appear with the description of one of its embodiments, the latter being given by referring to the attached drawings in which:

FIG. 1 is a diagram of a system according to the invention, and

FIGS. 2a and 2b are diagrams illustrating the operation of the system of FIG. 1.

The example which will be described relates to a motor vehicle with two headlamps 10 and 11. Each of the headlamps includes a reflector 12 and at least one flashlamp 13, 13'.

Each flashlamp is supplied by the secondary 14, 14' of a step-up transformer 15, 15'. The primaries 16, 16' of the transformers 15, 15' are connected to the output of a power amplifier 17 the input of which, $17_1$, receives pulses supplied by a generator circuit 18.

In front of the driver's eyes there is arranged a screen 20 made of a ferro-electric liquid crystal material with a front face 21 covered by a transparent electrode linked to earth and a rear face 22 covered by another transparent electrode linked to the output of the pulse generator circuit 18.

A detector 30 is arranged in proximity to the screen and is linked to the pulse generator circuit 18.

A polariser 23 is arranged in front of the face 21 of the screen 20 and a polariser 24 is arranged in the vicinity of the face 22 of this screen 20.

So that the headlamps of vehicles coming in the opposite direction are visible to the driver, the polarisers 23 and 24 must be slightly offset from perfect extinction, for example by an angle of about 1°. It is thus possible to use polarisers which are deliberately slightly imperfect.

In fact, the liquid crystal causes the polarisation plane of the light to turn. If the polarisers 23 and 24 are not offset, the liquid crystal causes the polarisation plane to turn by 90° and this makes the screen (consisting of the screen proper 20 and of the polarisers 23 and 24) completely opaque. Hence with the slight offset, or with slightly imperfect polarisers, even in the non-transparent state, the screen assembly lets light pass through so as to make it possible to see the headlamps of vehicles coming in the opposite direction.

The pulses produced by the generator 18 are represented in FIG. 2a. In this example, each pulse 25 has a duration of 100 microseconds and the period T separating two pulses 25 is of 5 milliseconds (200 pulses per second). Hence the duration of the pulse 25 is a fiftieth of the period T.

In FIG. 2b is represented the transmission coefficient of the screen 20 controlled by the pulses 25. The screen 20 exhibits a high transmission coefficient $CT_{MAX}$ during the duration of application of the pulses 25 and a low transmission coefficient $CT_{MIN}$ between the pulses 25.

The power of the headlamps is used fully for the driver since the screen 20 is transparent during the periods of light emission. In contrast, he sees the continuous light sources of the vehicles arriving in the opposite direction only with a mean transmission coefficient $CT_{MOY}$ of the screen which is very slightly greater than $CT_{MIN}$.

The generator 18 includes a phase shifter for off-setting the pulses 25 in time when the information supplied by the detector 30 shows that the vehicle coming in the opposite direction is sending out light pulses and these pulses coincide at least partially in time with the pulses from the generator 18. This shifting of the pulses 25 causes no problem by reason of their short duration with respect to the period T.

The anti-dazzle system can be used mainly to equip motor vehicles of all types: private cars, lorries, coaches, etc.

It can be envisaged that motor cycles may be equipped with a screen, for example on the helmet visor.

I claim:

1. An anti-dazzle system for a vehicle, comprising:

headlamp control means for controlling at least one headlamp of said vehicle whereby said headlamp outputs periodic light pulses having a duration which is short with regard to their period;

a screen arranged in front of a driver of said vehicle having a variable light transmission coefficient;

means responsive to said period pulses to vary the transmission coefficient of said screen whereby said screen is transparent only during the duration of said light pulses and wherein said transmission coefficient is substantially lower; but high enough to allow said driver to see headlamps of oncoming vehicles between said pulses.

2. System according to claim 1, characterised in that the ratio between the duration of each pulse (25) and the period is a fiftieth or less.

3. System according to claim 1, characterised in that the frequency of the pulses is of at least 200 pulses per second.

4. System according to claim 1, characterised in that the screen has transparent electrodes on each of its faces.

5. System according to claim 1, characterised in that the material of the screen is a preferably ferro-electric liquid crystal.

6. System according to claim 5, characterised in that, with the liquid crystal screen, there are associated two polarisers adjusted so that, without voltage applied to the screen, the assembly of the screen and of the two polarisers exhibits a nonzero transmission coefficient.

7. System according to claim 1, characterised in that the headlamps of the vehicle are equipped with flashlamps.

8. System according to claim 1, characterised in that it comprises a means for making the screen permanently transparent.

9. System according to claim 1, characterised in that the screen is retractable.

10. System according to claim 1, characterised in that the screen has the shape of a rectangle.

11. The anti-dazzle system according to claim 1, further comprising a detector which is sensitive to sources emitting light in a periodic fashion and a means which is sensitive to a signal output by said detector in order to determine whether the emission period of the sources detected coincide with the light emitted and, in the event of coincidence, to offset the light-pulses emitted with respect to the emission periods.

\* \* \* \* \*